US010614814B2

(12) United States Patent
Dachiraju et al.

(10) Patent No.: US 10,614,814 B2
(45) Date of Patent: Apr. 7, 2020

(54) TECHNOLOGIES FOR AUTHENTICATING A SPEAKER USING VOICE BIOMETRICS

(71) Applicant: Interactive Intelligence Group, Inc., Indianapolis, IN (US)

(72) Inventors: Rajesh Dachiraju, Hyperabad (IN); Aravind Ganapathiraju, Hyperabad (IN); Ananth Nagaraja Iyer, Indianapolis, IN (US); Felix Immanuel Wyss, Indianapolis, IN (US)

( * ) Notice: Subject to any disclaimer, the term of this patent is extended or adjusted under 35 U.S.C. 154(b) by 181 days.

(21) Appl. No.: 15/612,898

(22) Filed: Jun. 2, 2017

(65) Prior Publication Data

US 2017/0352353 A1 Dec. 7, 2017

Related U.S. Application Data

(60) Provisional application No. 62/344,647, filed on Jun. 2, 2016.

(51) Int. Cl.
*G10L 17/22* (2013.01)
*G10L 17/02* (2013.01)
(Continued)

(52) U.S. Cl.
CPC ............... *G10L 17/22* (2013.01); *G10L 15/02* (2013.01); *G10L 15/28* (2013.01); *G10L 17/00* (2013.01);
(Continued)

(58) Field of Classification Search
CPC ......... G10L 17/02; G10L 17/22; G10L 17/00; G10L 17/04; G10L 17/06
See application file for complete search history.

(56) References Cited

U.S. PATENT DOCUMENTS 3,466,394 A * 9/1969 French ............... G01R 29/033
704/247
5,091,948 A * 2/1992 Kametani ............... G10L 17/02
704/248
(Continued)

FOREIGN PATENT DOCUMENTS

WO 2015183254 A1 12/2015
WO WO 2015/183254 A1 12/2015

OTHER PUBLICATIONS

Drugman et al. "On the Potential of Glottal Signatures for Speaker Recognition", Eleventh Annual Conference of the International Speech Communication Association (Year: 2010).*
(Continued)

*Primary Examiner* — Samuel G Neway (57) ABSTRACT

Technologies for authenticating a speaker in a voice authentication system using voice biometrics include a speech collection computing device and a speech authentication computing device. The speech collection computing device is configured to collect a speech signal from a speaker and transmit the speech signal to the speech authentication computing device. The speech authentication computing device is configured to compute a speech signal feature vector for the received speech signal, retrieve a speech signal classifier associated with the speaker, and feed the speech signal feature vector to the retrieved speech signal classifier. Additionally, the speech authentication computing device is configured to determine whether the speaker is an authorized speaker based on an output of the retrieved speech signal classifier. Additional embodiments are described herein.

22 Claims, 7 Drawing Sheets

(51) Int. Cl.
*G10L 21/038* (2013.01)
*G10L 17/04* (2013.01)
*G10L 15/02* (2006.01)
*G10L 15/28* (2013.01)
*G10L 17/00* (2013.01)
*G10L 17/06* (2013.01)
*G10L 25/12* (2013.01)

(52) U.S. Cl.
CPC ............ *G10L 17/02* (2013.01); *G10L 17/04* (2013.01); *G10L 17/06* (2013.01); *G10L 21/038* (2013.01); *G10L 25/12* (2013.01)

(56) References Cited

U.S. PATENT DOCUMENTS

| | | | |
|---|---|---|---|
| 5,121,428 A * | 6/1992 | Uchiyama | G10L 17/02 704/243 |
| 5,377,301 A | 12/1994 | Rosenberg et al. | |
| 5,381,512 A * | 1/1995 | Holton | G10L 15/02 704/200.1 |
| 5,953,700 A | 9/1999 | Kanevsky et al. | |
| 6,088,669 A | 7/2000 | Maes | |
| 6,119,084 A * | 9/2000 | Roberts | G10L 17/20 704/243 |
| 7,386,448 B1 | 6/2008 | Poss et al. | |
| 2005/0060153 A1* | 3/2005 | Gable | G10L 17/02 704/246 |
| 2005/0096900 A1* | 5/2005 | Bossemeyer | G10L 17/02 704/219 |
| 2005/0171774 A1* | 8/2005 | Applebaum | G10L 17/06 704/250 |
| 2007/0094021 A1* | 4/2007 | Bossemeyer, Jr. | G10L 17/22 704/249 |
| 2011/0040561 A1 | 2/2011 | Vair et al. | |
| 2011/0251843 A1* | 10/2011 | Aronowitz | G10L 17/02 704/235 |
| 2014/0122063 A1* | 5/2014 | Gomez Vilda | G10L 19/02 704/200.1 |
| 2014/0222428 A1* | 8/2014 | Cumani | G10L 17/02 704/250 |
| 2015/0348535 A1* | 12/2015 | Dachiraju | G10L 25/90 704/266 |
| 2016/0027430 A1 | 1/2016 | Dachiraju et al. | |
| 2017/0352353 A1* | 12/2017 | Dachiraju | G10L 15/02 |

OTHER PUBLICATIONS

Drugman et al. "Detection of Glottal Closure Instants From Speech Signals: A Quantitative Review" IEEE Transactions on Audio, Speech, and Language Processing 20.3 (Year: 2012).*

Abhiram "Characterization of the voice source by the DCT for speaker information", Master Thesis, Indian Institute of Science (Year: 2014).*

International Search Report and Written Opinion for corresponding International Application No. PCT/US2017/035806, dated Aug. 11, 2017 (14 sheets).

Australian Government Examination Report No. 1 for Application No. 2017274657, dated Jun. 19, 2019, 3 pages.

Canadian Office Action for Application No. 3,030,133, dated Jul. 30, 2019, 4 pages.

New Zealand Intellectual Property Office First Examination Report for Application No. 749370, dated Aug. 9, 2019, 5 pages.

Kinnunen and Li, An Overview of Text-Independent Speaker Recognition: From Features to Supervectors, ScienceDirect Speech Communications 52 (2010) 12-40.

European Search Report from co-pending EP application 17807617.

* cited by examiner

TECHNOLOGIES FOR AUTHENTICATING A SPEAKER USING VOICE BIOMETRICS

CROSS REFERENCE TO RELATED APPLICATIONS

The present application is related to, and claims the priority benefit of, U.S. Provisional Patent Application Ser. No. 62/344,647 filed Jun. 2, 2016, the contents of which are hereby incorporated in their entirety into the present disclosure.

BACKGROUND OF THE DISCLOSED EMBODIMENTS

Corporate entities and individuals alike can be affected, to varying degrees, by unauthorized accesses to confidential information. As such, whether access is to a physical object (e.g., a computer, a building, an office, etc.), an online account, or a storage medium, access is oftentimes restricted to only those who are authorized such access. However, certain technologies for authenticating authorized access have been proven to be fairly easily circumvented. For example, access cards can be lost, passwords can be compromised, etc. As such, various biometric recognition techniques have been implemented in an effort to increase the security of authentication procedures, as the biometric indicators are generally considered to be unique to the individual and not easily replicated. For example, such biometric recognition techniques include iris scans, retina scans, fingerprint scans, facial recognition systems, speaker recognition systems, heart rate monitors, etc.

Speaker recognition systems rely on voice biometrics, or voice characteristics, to verify a person based on their speech, such as for authentication purposes, which is commonly referred to as speaker verification or speaker authentication in such context. Speaker verification consists of comparing a speaker's speech with only the speech of the person to be authenticated, which has been previously stored in the database, in order to determine that the person requesting authentication (i.e., speaking) is who they claim to be. However, present technologies rely on features of speech signal pertaining to filter/vocal tract (i.e., source-filter models of speech production) of the speaker. Such source-filter model filter/vocal tract technologies typically only rely on filter parameters. Accordingly, there exists a need for improvements in technologies for authenticating a speaker using voice biometrics.

SUMMARY OF THE DISCLOSED EMBODIMENTS

In one aspect, a method for authenticating a speaker in a voice authentication system using voice biometrics includes receiving, by a speech authentication computing device, a speech signal of a speaker collected by a speech collection computing device; computing, by the speech authentication computing device, a speech signal feature vector for the received speech signal; retrieving, by the speech authentication computing device, a speech signal classifier associated with the speaker; feeding, by the speech authentication computing device, the speech signal feature vector to the retrieved speech signal classifier; and determining, by the speech authentication computing device, whether the speaker is an authorized speaker based on an output of the retrieved speech signal classifier.

In some embodiments, computing the speech signal feature vector comprises (i) segmenting the speech signal into a plurality of glottal pulses, (ii) computing a glottal pulse feature vector for each of the plurality of glottal pulses, and (iii) computing the speech signal feature vector as a function of the glottal pulse feature vectors. In other embodiments, segmenting the speech signal into the plurality of glottal pulses includes pre-emphasizing the speech signal; extracting a plurality of linear prediction coefficients from the pre-emphasized speech signal; forming an inverse filter from the extracted linear prediction coefficients; filtering the speech signal using the inverse filter to obtain in inverse filtered signal; and segmenting the inverse filtered signal into the plurality of glottal pulses.

In some embodiments, segmenting the inverse filtered signal into the plurality of glottal pulses comprises segmenting the inverse filtered signal into the plurality of glottal pulses using zero frequency filtering. In other embodiments, computing the glottal pulse feature vectors comprises (i) decomposing each of the glottal pulses into three sub-band pulses, (ii) performing a metric-based clustering as a function of the glottal pulses and the corresponding three sub-band pulses, and (iii) computing the glottal pulse feature vectors as a function of a result of the metric-based clustering.

In some embodiments, decomposing each of the glottal pulses into three sub-band pulses includes transforming each glottal pulse into the frequency domain using a discrete cosine transform (DCT); determining two cut-off points of each DCT signal as a function of two identified sharp change points of each DCT signal; splitting each DCT signal into three sub-bands as a function of the determined cut-off points; and converting the three sub-bands into the time domain to determine the three sub-band pulses for each of the glottal pulses. In other embodiments, performing the metric-based clustering comprises performing the metric-based clustering using a modified k-means clustering algorithm.

In some embodiments, computing the speech signal feature vector as a function of the glottal pulse feature vectors comprises (i) performing a principal component analysis on the glottal pulse feature vectors to obtain eigenvectors for each glottal pulse feature vector and (ii) determining the speech signal feature vector as a function of each eigenvalue of the obtained eigenvectors. In other embodiments, determining the speech signal feature vector as a function of each eigenvalue of the obtained eigenvectors comprises determining the speech signal feature vector as a function of an eigenvector of the obtained eigenvectors having the highest eigenvalue.

In some embodiments, enrolling, by a speech authentication computing device, a speaker in the voice authentication system, wherein enrolling the speaker includes collecting a requisite number of speech signals from the speaker; computing an authenticated speech signal feature vector for each of the collected requisite number of speech signals; classifying each of the authenticated speech signal feature vectors as being authenticated; training the speech signal classifier to be associated with speaker as a function of the classification of the authenticated speech signal feature vectors and other speech signal feature vectors of the voice authentication system which have been previously classified as rejected during a background data collection phase for the voice authentication system.

In some embodiments, training the speech signal classifier comprises training the speech signal classifier using a two-class support vector machine classifier with a cosine similarity metric. In other embodiments, the method further includes providing, by a speech authentication computing device, an indication to the speaker indicating whether the speaker was authenticated as a function of the output of the retrieved speech signal classifier.

In another aspect, a speech authentication computing device for authenticating a speaker in a voice authentication system using voice biometrics includes one or more computer-readable medium comprising instructions; and one or more processors coupled with the one or more computer-readable medium and configured to execute the instructions to: receive a speech signal of a speaker collected by a speech collection computing device; compute a speech signal feature vector for the received speech signal; retrieve a speech signal classifier associated with the speaker; feed the speech signal feature vector to the retrieved speech signal classifier; and determine whether the speaker is an authorized speaker based on an output of the retrieved speech signal classifier.

In some embodiments, to compute the speech signal feature vector comprises to (i) segment the speech signal into a plurality of glottal pulses, (ii) compute a glottal pulse feature vector for each of the plurality of glottal pulses, and (iii) compute the speech signal feature vector as a function of the glottal pulse feature vectors. In other embodiments, to segment the speech signal into the plurality of glottal pulses comprises to pre-emphasize the speech signal; extract a plurality of linear prediction coefficients from the pre-emphasized speech signal; form an inverse filter from the extracted linear prediction coefficients; filter the speech signal using the inverse filter to obtain in inverse filtered signal; and segment the inverse filtered signal into the plurality of glottal pulses.

In some embodiments, to segment the inverse filtered signal into the plurality of glottal pulses comprises to segment the inverse filtered signal into the plurality of glottal pulses using zero frequency filtering. In other embodiments, to compute the glottal pulse feature vectors comprises to (i) decompose each of the glottal pulses into three sub-band pulses, (ii) perform a metric-based clustering as a function of the glottal pulses and the corresponding three sub-band pulses, and (iii) compute the glottal pulse feature vectors as a function of a result of the metric-based clustering.

In some embodiments, to decompose each of the glottal pulses into three sub-band pulses comprises to transform each glottal pulse into the frequency domain using a discrete cosine transform (DCT); determine two cut-off points of each DCT signal as a function of two identified sharp change points of each DCT signal; split each DCT signal into three sub-bands as a function of the determined cut-off points; and convert the three sub-bands into the time domain to determine the three sub-band pulses for each of the glottal pulses. In other embodiments, to perform the metric-based clustering comprises to perform the metric-based clustering using a modified k-means clustering algorithm.

In some embodiments, to compute the speech signal feature vector as a function of the glottal pulse feature vectors comprises to (i) perform a principal component analysis on the glottal pulse feature vectors to obtain eigenvectors for each glottal pulse feature vector and (ii) determine the speech signal feature vector as a function of each eigenvalue of the obtained eigenvectors. In other embodiments, to determine the speech signal feature vector as a function of each eigenvalue of the obtained eigenvectors comprises to determine the speech signal feature vector as a function of an eigenvector of the obtained eigenvectors having the highest eigenvalue.

In some embodiments, wherein the one or more processors are further configured to execute the instructions to enroll a speaker in the voice authentication system, wherein to enroll the speaker comprises to: collect a requisite number of speech signals from the speaker; compute an authenticated speech signal feature vector for each of the collected requisite number of speech signals; classify each of the authenticated speech signal feature vectors as being authenticated; train the speech signal classifier to be associated with speaker as a function of the classification of the authenticated speech signal feature vectors and other speech signal feature vectors of the voice authentication system which have been previously classified as rejected during a background data collection phase for the voice authentication system.

In some embodiments, to train the speech signal classifier comprises to train the speech signal classifier using a two-class support vector machine classifier with a cosine similarity metric. In other embodiments, the one or more processors are further configured to execute the instructions to provide an indication to the speaker indicating whether the speaker was authenticated as a function of the output of the retrieved speech signal classifier.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
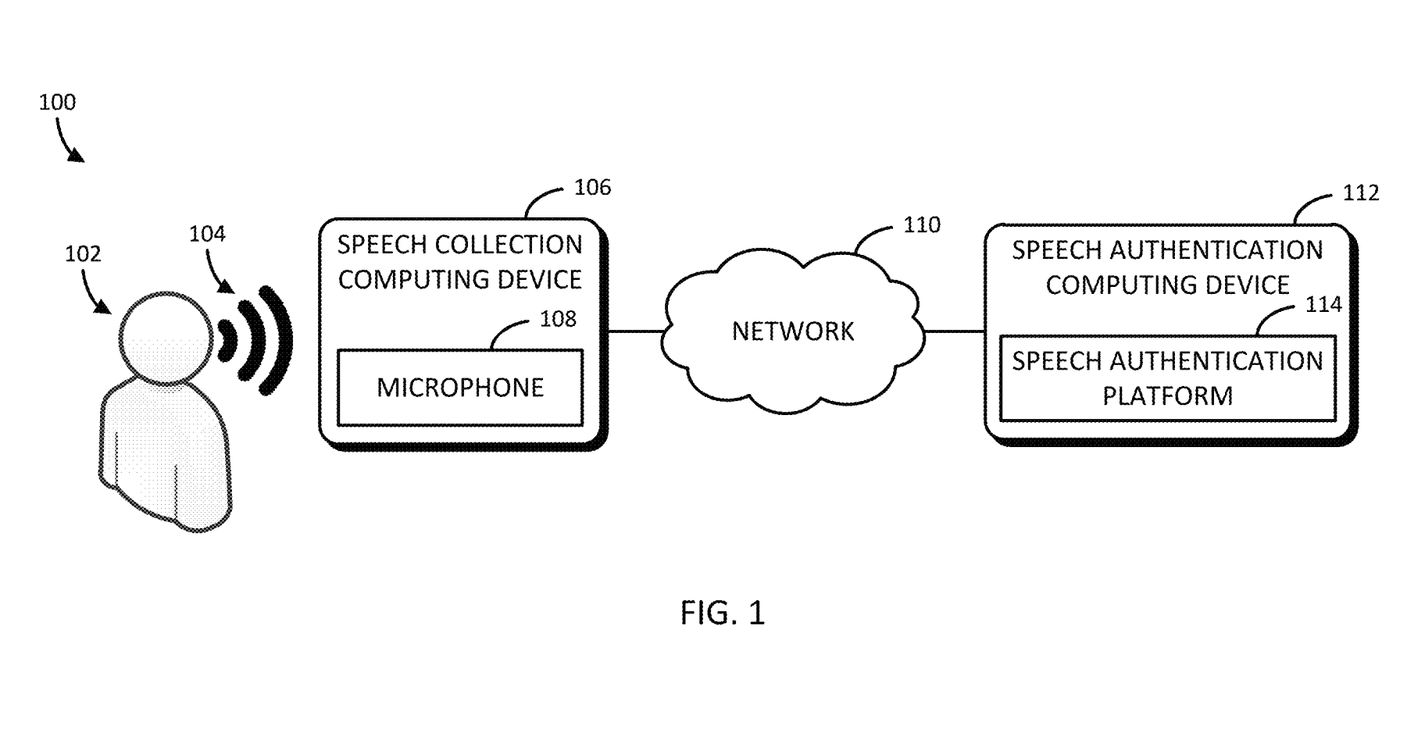
FIG. 1 is a simplified block diagram of at least one embodiment of a voice authentication system for authenticating a speaker using voice biometrics that includes a speech collection computing device and a speech authentication computing device.

FIG. 1 is an illustrative voice authentication system 100 for authenticating a speaker 102 using voice biometrics that includes a speech collection computing device 106 and a speech authentication computing device 112. In an illustrative example, the speaker 102 speaks (see, e.g., the speech utterance 104) into a speech collector (e.g., the microphone 108) of the speech collection computing device 106. The speech collector is configured to convert the speech utterance 104 into a speech signal and transmits the speech signal to the speech authentication computing device 112. The pitch of the speaker's voice is usually set by the frequency of glottal pulses (i.e., short bursts of air) during vowels or voiced consonants. Accordingly, the speech authentication computing device 112 is configured to determine the glottal pulses of the speech signal and compute a unique measurement (e.g., a feature vector) that is usable to identify the speaker 102 by their voice.

In an illustrative embodiment, upon receiving the speech signal of the speaker 102 from the speech collection computing device 106, the speech authentication computing device 112 can authenticate the speaker 102. To authenticate the speaker 102, the speech authentication computing device 112 is configured to compute a feature vector of the speaker 102 based on the received speech signal and feed the computed feature vector to a previously trained two-class statistical classifier associated with the speaker 102. Based on the output of the speech signal classifier, the speech authentication computing device 112 is configured to determine whether the speaker 102 was authenticated. Accordingly, as a result of the authentication determination, the speaker 102 may be authorized or denied access to a particular asset/location.

The speech collection computing device 106 is primarily configured to function as a resource for obtaining a speech utterance 104 from a speaker 102. However, it should be appreciated that, in some embodiments, the speech collection computing device 106 may be configured to perform other functions, such as one or more of those functions described herein as being performed by the speech authentication platform 114. In other words, in other embodiments, the functions described herein as being performed by the speech collection computing device 106 and the speech authentication computing device 112, respectively, may be performed by a single computing device or system of networked computing devices. The speech collection computing device 106 may be embodied as, but is not limited to, one or more desktop computers, mobile computing devices (e.g., a smartphone, a wearable, a tablet, a laptop, a notebook, etc.), access control system devices, and/or any other type of computing device capable of collecting a speech utterance 104 from a speaker 102.

Figure 2:
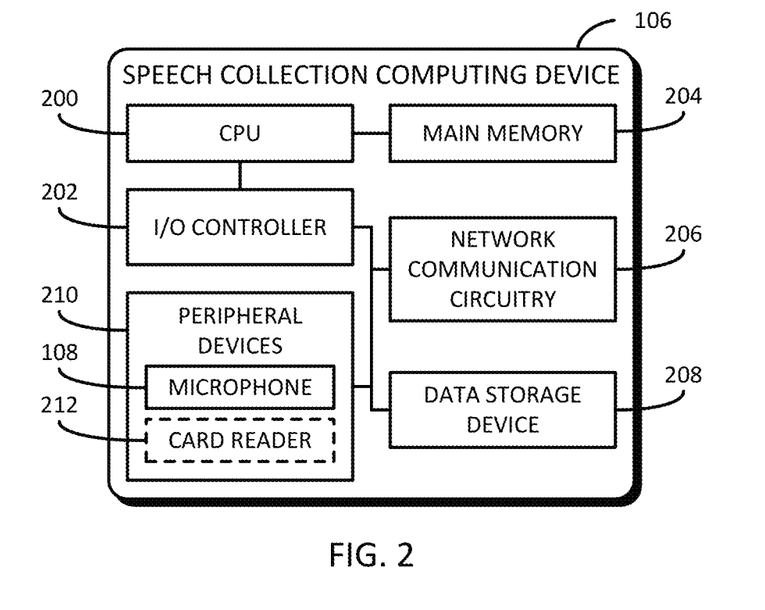
FIG. 2 is a simplified block diagram of at least one embodiment of the speech collection computing device of the voice authentication system of FIG. 1.

Referring now to FIG. 2, an illustrative speech collection computing device 106 includes a central processing unit (CPU) 200, an input/output (I/O) controller 202, a main memory 204, network communication circuitry 206, a data storage device 208, and I/O peripherals 210. In some alternative embodiments, the computing device 118 may include additional, fewer, and/or alternative components to those of the illustrative speech collection computing device 106, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the speech collection computing device 106 may be predicated upon the type and intended use of the speech collection computing device 106. For example, the speech collection computing device 106 embodied as an access control device may include one or more access control components, such as a camera, a card reader 212, etc. Accordingly, it should be appreciated that the voice authentication system 100 as described herein may be used in conjunction with other authentication technologies, in some embodiments.

The CPU 200, or processor, may be embodied as any combination of hardware and circuitry capable of processing data. In some embodiments, the speech collection computing device 106 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the speech collection computing device 106. Illustratively, the I/O controller 202 is configured to receive input/output requests from the CPU 200, and send control signals to the respective input/output devices, thereby managing the data flow to/from the speech collection computing device 106.

The memory 204 may be embodied as any type of computer hardware or combination of circuitry capable of holding data and instructions for processing. Such memory 204 may be referred to as main or primary memory. It should be appreciated that, in some embodiments, one or more components of the speech collection computing device 106 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the speech collection computing device 106 to a computer network (e.g., a local area network (LAN)), as well as other devices, depending on the embodiment.

The data storage device 208 may be embodied as any type of computer hardware capable of the non-volatile storage of data (e.g., semiconductor storage media, magnetic storage media, optical storage media, etc.). Such data storage devices 208 are commonly referred to as auxiliary or secondary storage, and are typically used to store a large amount of data relative to the memory 204 described above.

Each of the I/O peripherals 210 may be embodied as any type of auxiliary device configured to connect to and communicate with the speech collection computing device 106. As illustratively shown, the I/O peripherals 210 includes a microphone 108 and, in some embodiments, a card reader 212. However, it should be appreciated that, depending on the embodiment of the speech collection computing device 106, the I/O peripherals 210 may include additional and/or alternative I/O devices, such as, but not limited to, a camera, a display, a speaker, a mouse, a keyboard, a touchscreen, a printer, a scanner, etc. Accordingly, it should be appreciated that some I/O devices are capable of one function (i.e., input or output), or both functions (i.e., input and output).

In some embodiments, the I/O peripherals 210 may be connected to the speech collection computing device 106 via a cable (e.g., a ribbon cable, a wire, a universal serial bus (USB) cable, a high-definition multimedia interface (HDMI) cable, etc.) connected to a corresponding port (not shown) of the speech collection computing device 106 through which the communications made therebetween can be managed by the I/O controller 202. In alternative embodiments, the I/O peripherals 210 may be connected to the speech collection computing device 106 via a wireless mode of communication (e.g., Bluetooth®, Wi-Fi®, etc.) which may be managed by the network communication circuitry 206.

Referring again to FIG. 1, the speech collection computing device 106 is communicatively coupled to the speech authentication computing device via a network 110. The network 110 may be implemented as any type of wired and/or wireless network, including a WLAN/LAN, a wide area network (WAN), a global network (the Internet), etc. Accordingly, the network 110 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc. It should be appreciated that the speech collection computing device 106 and the speech authentication computing device 112 may use different networks (e.g., LANs, provider networks, etc.) to connect to the backbone of the network 110 such that a number of communication channels can be established therein to enable communications therebetween.

The speech authentication computing device 112 may be embodied as one or more servers (e.g., stand-alone, rack-mounted, etc.), compute devices, storage devices, and/or combination of compute blades and data storage devices (e.g., of a storage area network (SAN)) in a cloud architected network or data center. It should be appreciated that, in some embodiments, the speech authentication computing device 112 may be embodied as more than one computing device (e.g., in a distributed computing architecture), each of which may be usable to perform at least a portion of the functions described herein of the speech authentication computing device 112. Accordingly, in such embodiments, it should be further appreciated that one or more computing devices of the speech authentication computing device 112 may be configured as a database server with less compute capacity and more storage capacity relative to another of the computing devices of the speech authentication computing device 112. Similarly, one or more other computing devices of the speech authentication computing device 112 may be configured as an application server with more compute capacity relative and less storage capacity relative to another of the computing devices of the speech authentication computing device 112.

Figure 3:
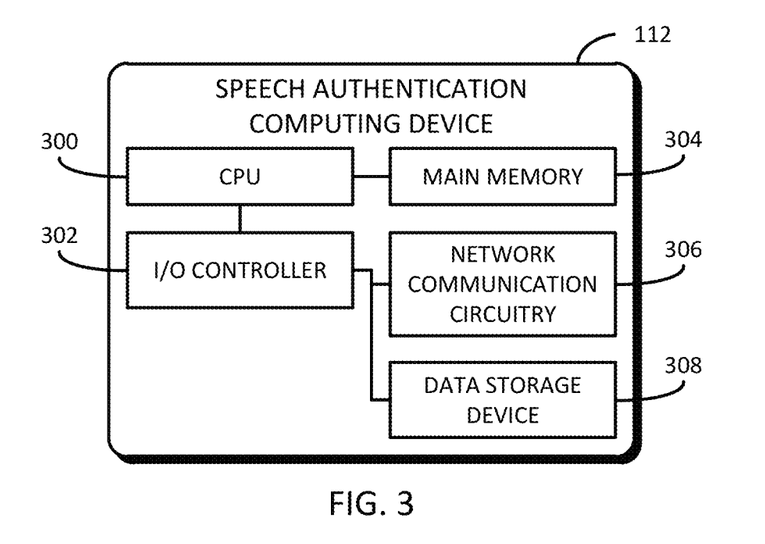
FIG. 3 is a simplified block diagram of at least one embodiment of the speech authentication computing device of the voice authentication system of FIG. 1.

Referring now to FIG. 3, an illustrative speech authentication computing device 112 includes a CPU 300, an I/O controller 302, a main memory 304, network communication circuitry 306, and a data storage device 308. It should be appreciated that such components may be similar to those components of the illustrative speech collection computing device 106 of FIG. 2, which were described previously. Accordingly, the illustrative components of the speech authentication computing device 112 are not described herein to preserve clarity of the description.

Figure 4:
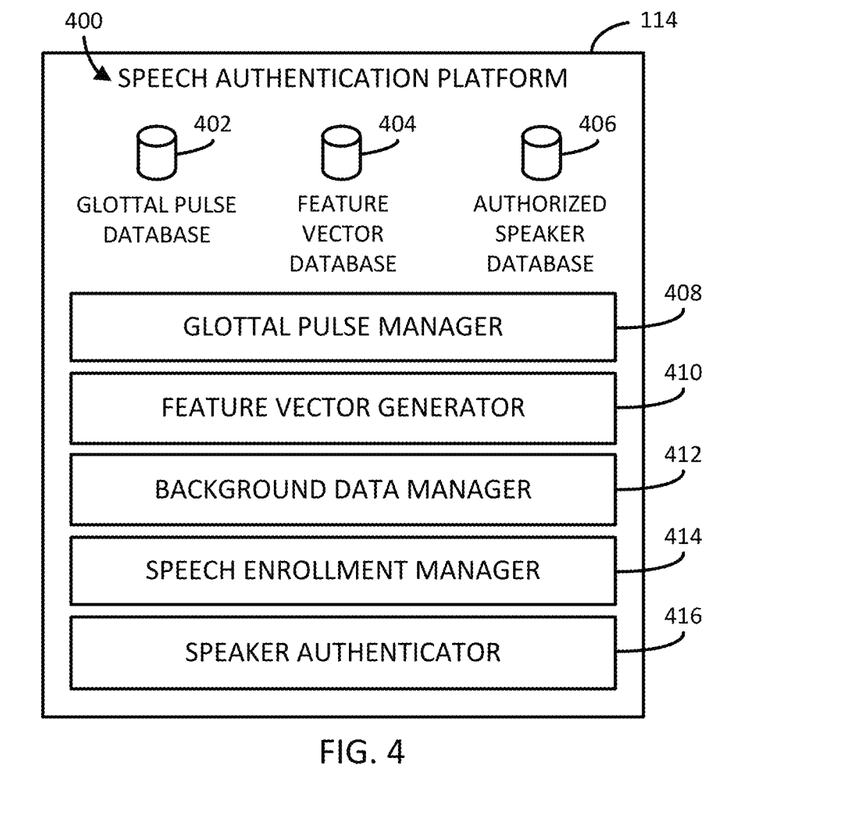
FIG. 4 is a simplified block diagram of at least one embodiment of an environment of a speech authentication platform of the speech authentication computing device of FIGS. 1 and 3.

As shown in FIG. 1, the illustrative speech authentication computing device 112 includes a speech authentication platform 114. Referring now to FIG. 4, an illustrative environment 400 of the speech authentication platform 114 is shown. The speech authentication platform 114 may be embodied as any combination of hardware, firmware, software, or circuitry usable to perform the functions described herein. In some embodiments, the a speech authentication platform 114 may include one or more computer-readable medium (e.g., the memory 304, the data storage device 308, and/or any other media storage device) having instructions stored thereon and one or more processors (e.g., the CPU 300) coupled with the one or more computer-readable medium and configured to execute instructions to perform the functions described herein.

The illustrative environment 400 includes a glottal pulse database 402, a feature vector database 404, and an authorized speaker database 406. While the glottal pulse database 402, the feature vector database 404, and the authorized speaker database 406 are illustratively shown as residing on the speech authentication platform 114, in some embodiments, one or more of the glottal pulse database 402, the feature vector database 404, and the authorized speaker database 406 may be located remote of the speech authentication platform 114 (e.g., on dedicated storage devices). It should be appreciated that, in some embodiments, the illustrative databases described herein may be combined or further segregated. Additionally or alternatively, it should be further appreciated that the data stored therein may not be mutually exclusive to the respective database as described herein.

In some embodiments, access to the data provided to and/or generated as described herein may require authorization and/or that such data is encrypted while in storage and/or transit. Accordingly, in some embodiments, one or more authentication and/or encryption technologies known to those of skill in the art may be employed to ensure the storage and access to the data complies with any legal and/or contractual requirements. It should be further appreciated that, in some embodiments, the data stored in the respective databases may not be mutually exclusive. In other words, certain data described herein as being stored in one database may additionally or alternatively be stored in another database described herein, or another database altogether. It should be further appreciated that, in some embodiments, the data may be stored in a single database, or an alternative database/data storage arrangement.

The illustrative speech authentication platform 114 includes a glottal pulse manager 408, a feature vector generator 410, a background data manager 412, a speech enrollment manager 414, and a speaker authenticator 416, each of which may be embodied as any type of firmware, hardware, software, circuitry, or combination thereof that is configured to perform the functions described herein. While the functionality of the speech authentication platform 114 is described herein as being performed by a particular component or set of components, it should be appreciated that, in other embodiments, the speech authentication platform 114 may include additional and/or alternative components for performing the functions described herein.

The glottal pulse manager 408 is configured to extract glottal pulses from the speech signals received by the speech authentication platform 114. In some embodiments, the extracted glottal pulses may be stored in the glottal pulse database 402. To extract the glottal pulses, the glottal pulse manager 408 is configured to extract, from a pre-emphasized speech signal of the received speech signal, one or more linear prediction coefficients (e.g., on an order of 24 for a sampling rate of 16 kHz). The glottal pulse manager 408 is further configured to form an inverse filter as a function of the extracted linear prediction coefficients and obtain an inverse filtered signal (i.e., an approximation of the glottal excitation) as a function of the inverse filter and the received speech signal. Additionally, the glottal pulse manager 408 is configured to segment the inverse filtered signal into a number of glottal pulses, such as by using zero frequency filtering techniques.

It should be appreciated that the energy of the glottal pulses are not uniform in the spectral domain, and are usually high in low frequency, which can result in a metric between two pulses depending more on matching at the low frequencies, thereby reducing the accuracy of the matching (e.g., for authentication purposes described below) in the low frequencies. Accordingly, to remedy this deficiency, the glottal pulse manager 408 is configured to decompose each glottal pulse into three sub-band pulses, apply a metric between corresponding sub-band pulses, and associate the overall metric with the respective glottal pulse. To do so, the glottal pulse manager 408 is configured to transform a glottal pulse into the frequency domain, such as by using a discrete cosine transform.

The glottal pulse manager 408 is further configured to identify two sharp change points in the spectrum that may be used as cut-off frequencies, such as may be identified by applying zero frequency resonator techniques on the discrete cosine transform of the glottal pulse. Additionally, the glottal pulse manager 408 is configured to segment the spectrum into three bands based on the two cut-off frequencies. It should be appreciated that, in certain embodiments, one or both of the cut-off frequencies may not be determinable. In such embodiments, a predetermined cut-off frequency (e.g., 600 Hz, 900 Hz, 1800 Hz, 2400 Hz, etc.) may be used. In an illustrative embodiment in which neither cut-off frequency is determinable, the predetermined cut-off frequencies may be 900 Hz and 2400 Hz. The glottal pulse manager 408 is additionally configured to convert the three bands into the time domain to get three sub-band pulses of the glottal pulse. It should be appreciated that, in some embodiments, the sub-band pulses may be associated with the corresponding glottal pulse and stored in the glottal pulse database 402.

The glottal pulse manager 408 is also configured to perform metric-based clustering of the glottal pulses. In an illustrative embodiment, the glottal pulse manager 408 is also configured to perform the metric-based clustering of the glottal pulses using a modified k-means clustering algorithm. To do so, the glottal pulse manager 408 is configured to replace the Euclidean distance metric of the traditional k-means clustering algorithm with a metric $d(x,y)$ defined for two glottal pulses x and y. As such, the glottal pulse manager 408 is configured to determine a metric, or notion of distance (i.e., $d(x, y)$), between the two glottal pulses (i.e., x and y).

To determine the metric, the glottal pulse manager 408 is configured to decompose each of the glottal pulses into their respective three sub-band pulses (e.g., $x^{(1)}$, $x^{(2)}$, $x^{(3)}$, as described above, such that each of the sub-band pulses has the same length. Accordingly, the glottal pulse manager 408 is configured to determine the metric between two glottal pulses x and y using the following equation:

$$d(x, y) = \sqrt{d_s^2(x^{(1)}, y^{(1)}) + d_s^2(x^{(2)}, y^{(2)}) + d_s^2(x^{(3)}, y^{(3)})}$$

wherein $d_s(f, g)$ is the sub-band metric between any two pulses f, g. The glottal pulse manager 408 is additionally configured to determine the normalized circular cross correlation between f and g using the following equation:

$$R(n) = f \cdot g.$$

The glottal pulse manager 408 is further configured to determine the highest of the lengths f, g as a function of the period for circular correlation and linearly extend the shorter signal(s). Additionally, the glottal pulse manager 408 is configured to compute $R_h(n)$ as the discrete Hilbert transform of $R(n)$ to obtain the signal using the following equation:

$$H(n) = \sqrt{(R(n))^2 + (R_h(n))^2}$$

wherein the glottal pulse manager 408 is configured to determine the cosine of the angle ($\theta$) between the two signals f and g using the following equation:

$$\cos \theta = \sup_n H(n)$$

wherein $\sup_n H(n)$ corresponds to the maximum value among all the samples of signal $H(n)$. As such, the glottal pulse manager 408 is further configured to determine the metric $d(f, g)$ using the following equation:

$$d(f,g) = \sqrt{2(1-\cos\theta)}$$

In addition to replacing the Euclidean distance metric of the traditional k-means clustering algorithm, the glottal pulse manager 408 is additionally configured to update the centroids of the clusters in a different manner than the traditional k-means clustering algorithm. To do so, given a cluster of glottal pulses whose elements are denoted as $\{g_1, g_2, \ldots g_N\}$, the centroid (i.e., the medoid) is considered as element $g_c$, such that the following equation:

$$D_m = \sum_{i=1}^{N} d^2(g_i, g_m)$$

is the minimum for m=c. The glottal pulse manager 408 is further configured to terminate the clustering iterations when there is no shift in any of the centroids of the k clusters.

The feature vector generator 410 is configured to generate a feature vector for a glottal pulse associated with a speaker (e.g., the speaker 102 of FIG. 1) that is usable to identify that speaker by their voice. To generate the feature vector, the feature vector generator 410 is configured to assign each pulse in the glottal pulse database having a size L to the closes cluster centroid, based on the distance metric, given a global pulse $x_i$, and assuming $c_1, c_2, \ldots c_i, \ldots c_N$ are the centroid glottal pulses determined by the previously performed clustering (e.g., by the glottal pulse manager 408). Assuming the total number of elements assigned to a centroid $c_j$ is $n_j$, the feature vector generator 410 is configured to define the following equation:

$$\psi_j(x_i) = \{d^2(x_i, c_j) - d^2(x_i, x_0) - d^2(c_j, x_0)\}\sqrt{\frac{n_j}{L}}$$

wherein $x_0$ is a fixed glottal pulse selected from the glottal pulse database. It should be appreciated that, while the choice of the $x_0$ selected from the glottal pulse database should not affect the accuracy of the voice authentication system 100, the $x_0$ selected from the glottal pulse database should be maintained constant.

The feature vector generator 410 is further configured to determine the vector representation ($V_i$) for the sub-band pulse $x_i$ using the following equation:

$$V_i = [\psi_1(x_i), \psi_2(x_i), \psi_3(x_i), \ldots \psi_j(x_i), \ldots \psi_N(x_i)]$$

The feature vector generator 410 is also configured to store the calculated feature vector for every glottal pulse extracted from the speech signal. It should be appreciated that the feature vectors may be associated with a corresponding speaker and/or glottal pulse and stored in the feature vector database, in some embodiments.

Additionally, the feature vector generator 410 is configured to determine the feature vector for each speech signal. To determine the feature vector, the feature vector generator 410 is configured to obtain an eigenvector for each of the feature vectors associated with a glottal pulse. To obtain the eigenvector, the feature vector generator 410 is configured to perform a principal component analysis (PCA) on the collection of feature vectors associated with a glottal pulse (e.g., such as may be stored in the glottal pulse database 402).

To perform the PCA, the feature vector generator 410 is configured to determine the mean vector (i.e., $v_{mean}$) the entire vector database $\{v_i\}$ and subtract the mean vector from mean, of each vector to obtain mean subtracted vectors $\{u_i\}$. The feature vector generator 410 is further configured to compute eigenvectors of the covariance matrix of the collection of vectors $\{u_i\}$ and select the eigenvector corresponding to the highest eigenvalue as the feature vector for that speech signal. The selected feature vectors may be stored in the feature vector database 404, in some embodiments.

The background data manager 412 is configured to create and manage the background data usable to train a statistical classifier for a speaker during enrollment in the voice authentication system 100. To create the background data, the background data manager 412 is configured to collect a predetermined number of speech signals (e.g., 3 speech signals, 5 speech signals, 10 speech signals, etc.) from a predetermined number of speakers (e.g., 100 speakers, 200 speakers, 300 speakers, etc.). Upon collection, the background data manager 412 is configured to transmit each speech signal to the respective component(s) for feature vector computation (e.g., as may be performed by the feature vector generator 410). Upon each feature vector being computed, the background data manager 412 is further configured to classify each computed feature vector as being rejected and associated with the background data. In some embodiments, the background data may be stored in the rejected vector database 406.

The speech enrollment manager 414 is configured to train a classifier for a speaker during enrollment in the voice authentication system 100 such that the speaker can be authenticated using their voice. To do so, the speech enrollment manager 414 is configured to collect a predetermined number of speech signals (e.g., 3 speech signals, 5 speech signals, 10 speech signals, etc.) for a duration of time (e.g., 20 seconds, 40 seconds, 60 seconds, etc.) from a speaker. Upon collection, the background data manager 412 is configured to transmit each speech signal to the respective component(s) for feature vector computation (e.g., as may be performed by the feature vector generator 410). Upon each feature vector being computed, the background data manager 412 is further configured to classify each computed feature vector as being authenticated and associated with the speaker.

The speech enrollment manager 414 is additionally configured to train a stastical classifier with two classes: authenticated and rejected. As noted previously, the rejected class refers to the background data, such as may be created by the background data manager 412. For example, in some embodiments, the background data manager 412 may be configured to use a two-class support vector machine (SVM) classifier with a cosine similarity metric. The resulting speech signal classifier may be associated with the speaker and stored in the authorized speaker database 406, in some embodiments. To ensure consistency, it should be appreciated that the background data should remain fixed and the same two-class statistical classifier employed for each speaker.

The speaker authenticator 416 is configured to authenticate a speaker as a function of the previously trained speech signal classifier and a speech signal received from the speaker during an authentication attempt. To do so, the speaker authenticator 416 is configured to collect a speech signal from a speaker attempting to authenticate their identity. Upon collection, the speaker authenticator 416 is configured to transmit the received speech signal to the respective component(s) for feature vector computation (e.g., as may be performed by the feature vector generator 410).

Upon the feature vector being computed, the speaker authenticator 416 is further configured to feed the computed feature vector to the trained speech signal classifier (e.g., as may be performed by the speech enrollment manager 414) associated with that speaker. Additionally, the speaker authenticator 416 is configured to determine whether to authenticate the user as a function of the output of the speech signal classifier. In other words, the speaker authenticator 416 is configured to determine whether the speaker is authenticated or rejected based on the output of the speech signal classifier, such that the determination may be used by an access control system to either permit or deny access to the speaker.

Figure 5A:
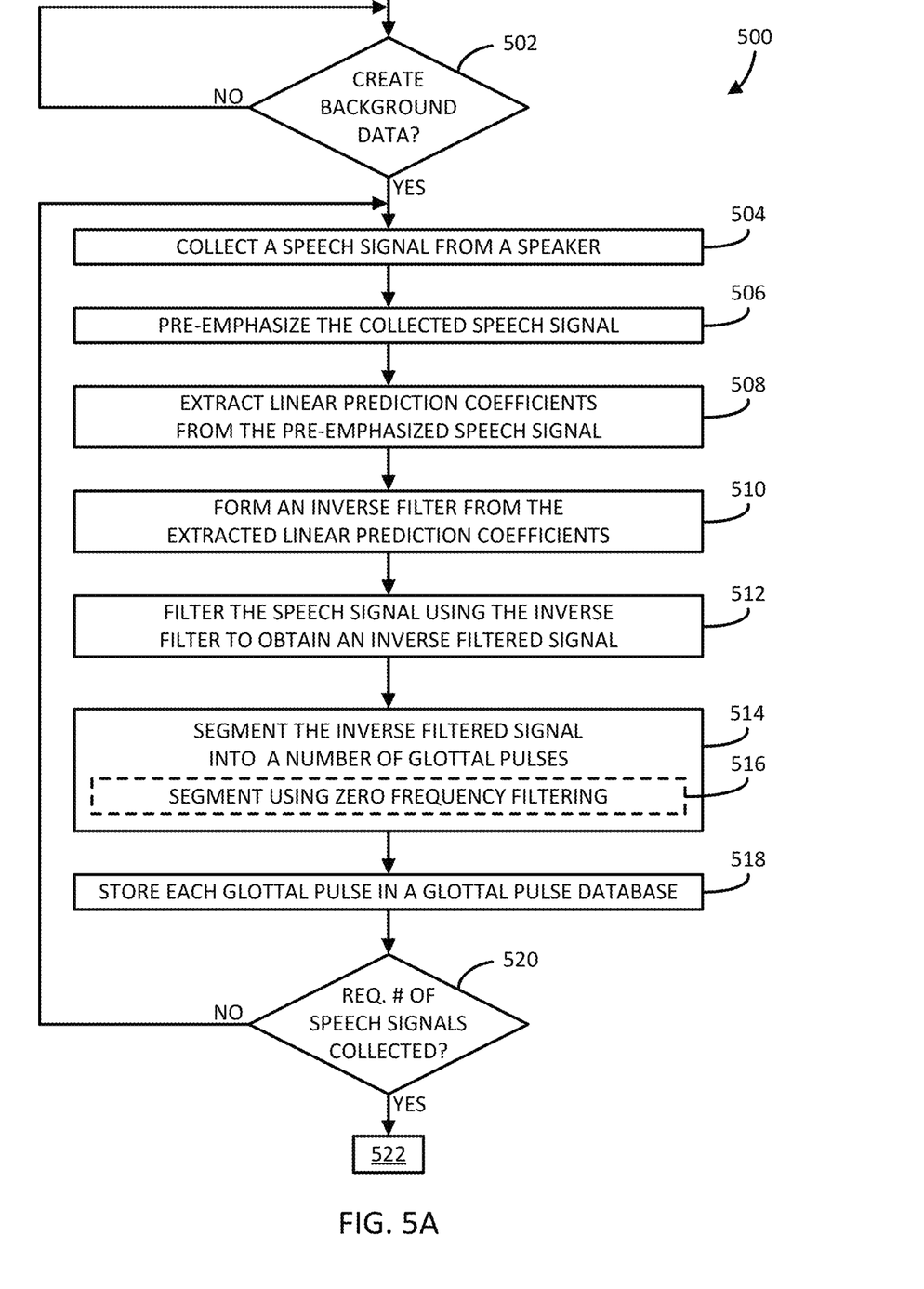
FIGS. 5A and 5B are a simplified flow diagram of at least one embodiment of a method for creating background data that may be executed by the speech authentication platform of FIGS. 1 and 4.
Figure 5B:
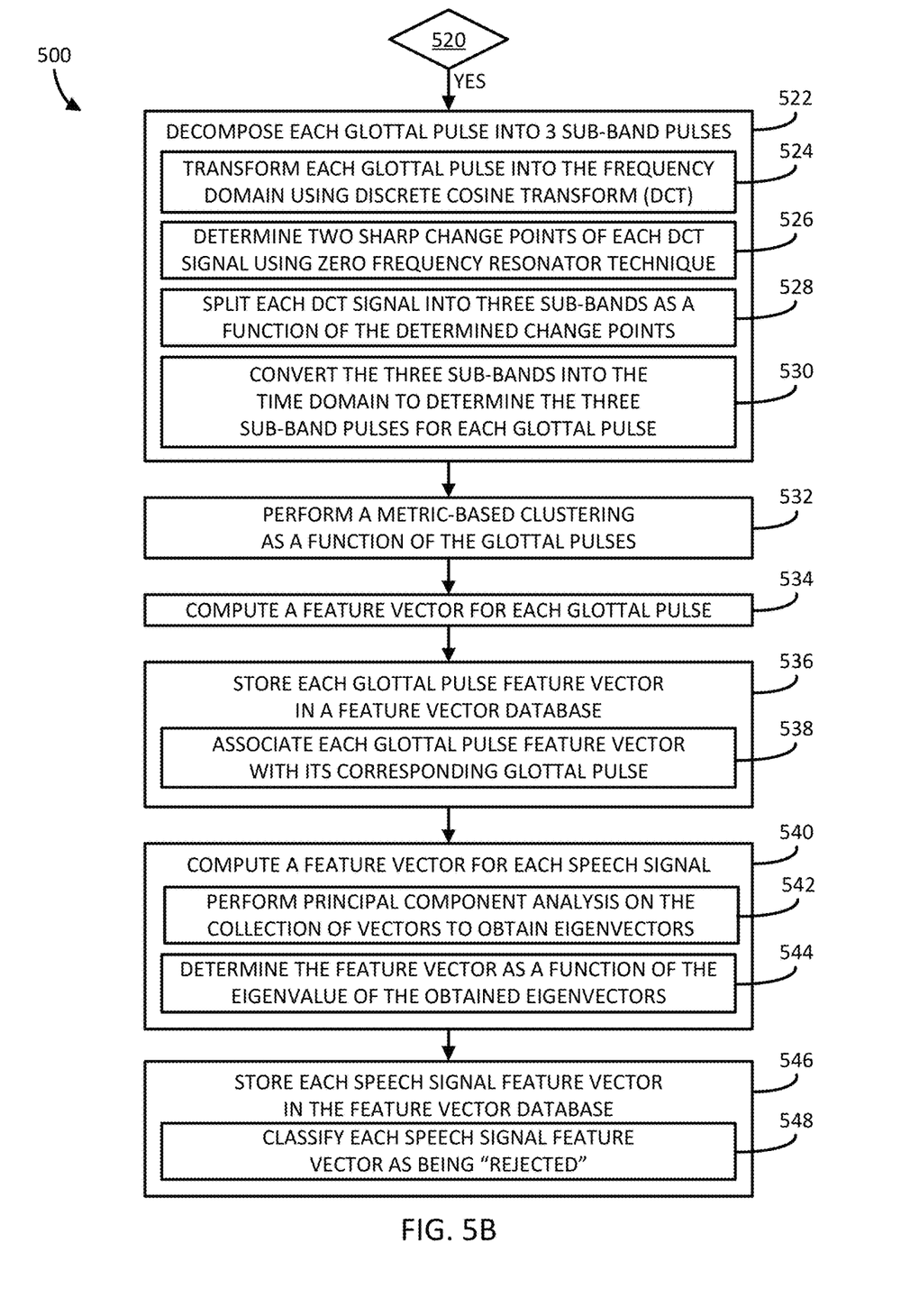

Referring now to FIGS. 5A and 5B, an illustrative method 500 is provided for creating background data (i.e., a background data collection phase), which may be executed by the speech authentication computing device 112, or more particularly the speech authentication platform 114 of the speech authentication computing device 112. The method 500 begins in block 502, in which the speech authentication platform 114 determines whether to create the background data. If so, the method 500 advances to block 504, in which the speech authentication platform 114 collects a speech signal from a speaker (e.g., the speaker 102 of FIG. 1). As described previously, a speech utterance (i.e., the speaker's voice) is received by a speech collection computing device (e.g., the speech collection computing device 106 of FIG. 1) and the converted speech signal is transmitted to the speech authentication computing device 112 for analysis by the speech authentication platform 114.

In block 506, the speech authentication platform 114 pre-emphasizes the collected speech signal. It should be appreciated that pre-emphasizing the speech signal comprises the speech signal being filtered using a finite impulse response filter with coefficients 1, −0.98. In block 508, the speech authentication platform 114 extracts linear prediction coefficients from the pre-emphasized signal. In block 510, the speech authentication platform 114 forms an inverse filter from the extracted linear prediction coefficients. In block 512, the speech authentication platform 114 filters the speech signal using the inverse filter to obtain an inverse filtered signal. In block 514, the speech authentication platform 114 segments the inverse filtered signal into a number of glottal pulses. To do so, in some embodiments, in block 516, the speech authentication platform 114 segments the inverse filtered signal using zero frequency filtering techniques.

In block 518, the speech authentication platform 114 stores each glottal pulse in a glottal pulse database (e.g., the glottal pulse database 402 of FIG. 4). In block 520, the speech authentication platform 114 determines whether a required number of speech signals have been collected. As described previously, creating the background data requires a collecting a predetermined number of speech signals (e.g., 3 speech signals, 5 speech signals, 10 speech signals, etc.) from a predetermined number of speakers (e.g., 100 speakers, 200 speakers, 300 speakers, etc.). If the speech authentication platform 114 determines the required number of speech signals have not been collected, the method 500 returns to block 504 to collect a speech signal from that same speaker or another speaker; otherwise, the method 500 advances to block 522 (shown in FIG. 5B).

In block 522, the speech authentication platform 114 decomposes each glottal pulse into three sub-band pulses. To do so, in block 524, the speech authentication platform 114 transforms each glottal pulse into the frequency domain using a discrete cosine transform. Additionally, in block 526, the speech authentication platform 114 determines two sharp change points (i.e., the cut-off frequencies) of each discrete cosine transform signal using zero frequency resonator techniques. Further, in block 528, the speech authentication platform 114 splits each discrete cosine transform signal into three sub-bands as a function of the determined cut-off frequencies. As described previously, in certain embodiments, one or both of the cut-off frequencies may not be determinable, in which case a predetermined cut-off frequency may be used. Additionally, in block 530, the speech authentication platform 114 converts the three sub-bands into time domain, which results in the three sub-bands being converted into three sub-band pulses for the corresponding glottal pulse.

In block 532, the speech authentication platform 114 performs a metric-based clustering as a function of the glottal pulses. As described previously, the speech authentication platform 114 performs the metric-based clustering of the glottal pulses using a modified k-means clustering algorithm. In block 534, the speech authentication platform 114 computes a feature vector for each glottal pulse, which has been described previously (see the description of the feature vector generator 410 of FIG. 4 described above). In block 536, the speech authentication platform 114 stores each glottal pulse feature vector in a feature vector database (e.g., the feature vector database 404 of FIG. 4). Additionally, in block 538, the speech authentication platform 114 associates each stored glottal pulse feature vector with its corresponding glottal pulse.

In block 540, the speech authentication platform 114 computes a feature vector for each speech signal. To do so, as described previously, in block 542 the speech authentication platform 114 performs a PCA on the collection of feature vectors associated with a glottal pulse (e.g., such as may be stored in the glottal pulse database 402) to compute the corresponding eigenvectors. Additionally, in block 544 the speech authentication platform 114 determines the feature vector as a function of the eigenvalues associated with the computed eigenvectors. As also described previously, the speech authentication platform 114 selects the eigenvector corresponding to the highest eigenvalue as the feature vector for that speech signal. In block 546, the speech authentication platform 114 stores each speech signal feature vector in the feature vector database. Additionally, in block 548, the speech authentication platform 114 classifies each speech signal feature vector as being rejected.

Figure 6:
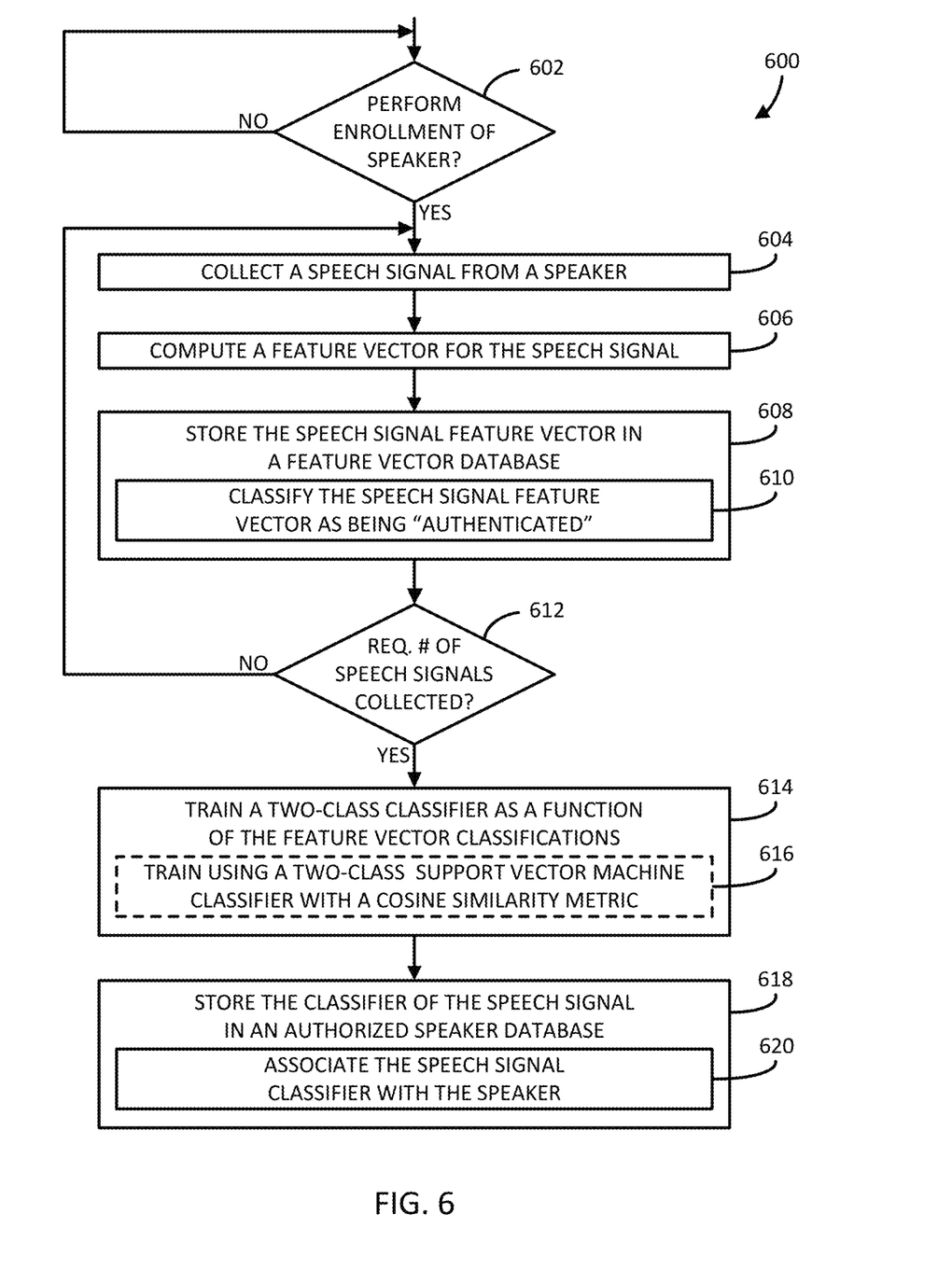
FIG. 6 is a simplified flow diagram of at least one embodiment of a method for training a statistical classifier for authenticating a speaker that may be executed by the speech authentication platform of FIGS. 1 and 4.

Referring now to FIG. 6, an illustrative method 600 is provided for training a statistical classifier for authenticating a speaker (i.e., an enrollment and training phase), which may be executed by the speech authentication computing device 112, or more particularly the speech authentication platform 114 of the speech authentication computing device 112. The method 600 begins in block 602, in which the speech authentication platform 114 determines whether to perform enrollment of a speaker (e.g., the speaker 102 of FIG. 1). For example, the speech authentication platform 114 may determine that a new speaker (e.g., that is authorized access to an asset/location) is being added to the voice authentication system 100.

If so, the method 600 advances to block 604, in which the speech authentication platform 114 collects a speech signal from a speaker. As described previously, a speech utterance (i.e., the speaker's voice) is received by a speech collection computing device (e.g., the speech collection computing device 106 of FIG. 1) and the converted speech signal is transmitted to the speech authentication computing device 112 for analysis by the speech authentication platform 114. In block 606, the speech authentication platform 114 computes a feature vector for the collected speech signal (see, e.g., the speech signal feature vector generation described in block 540 of the method 500). In block 608, the speech authentication platform 114 stores the authenticated speech signal feature vector in a feature vector database (e.g., the feature vector database 404 of FIG. 4). Additionally, in block 610, the speech authentication platform 114 classifies the authenticated speech signal feature vector as being authenticated.

As described previously, the speech authentication platform 114 collects a predetermined number of speech signals over a duration of time from the speaker. Accordingly, in block 612 the speech authentication platform 114 determines whether the required number of speech signals has been collected to enroll the speaker. If not, the method 600 returns to block 604 to collect another speech signal; otherwise, the method 600 advances to block 614. In block 614, the speech authentication platform 114 trains a two-class statistical classifier as a function of the feature vector classifications: authorized and rejected. To do so, in some embodiments, in block 616, the speech authentication platform 114 uses a two-class SVM classifier with a cosine similarity metric. In block 618, the speech authentication platform 114 stores the trained classifier of the speech signal (i.e., the speech signal classifier) in an authorized speaker database (e.g., the authorized speaker database 406 of FIG. 4). Additionally, in block 620, the speech authentication platform 114 associates the speech signal classifier with the speaker.

Figure 7:
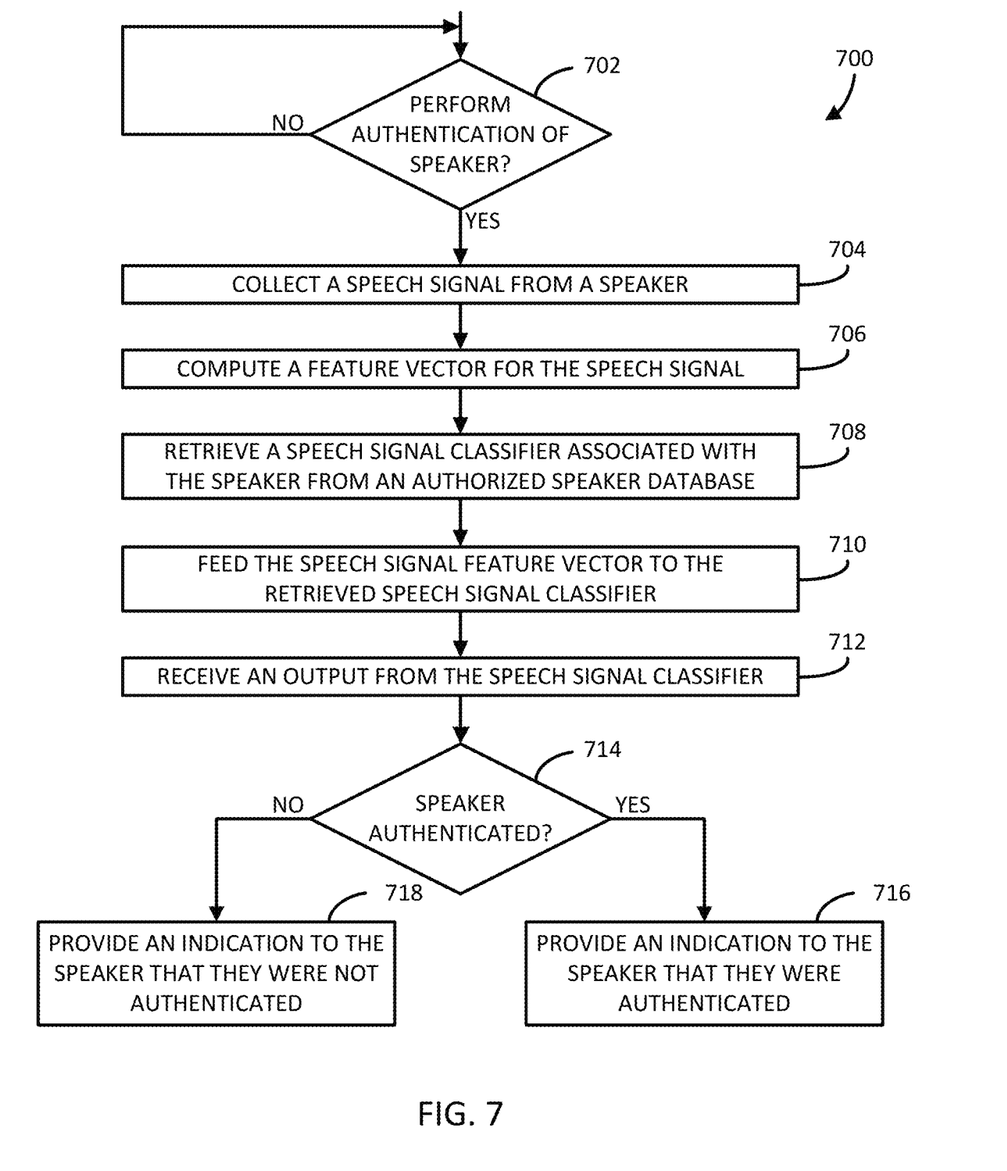
FIG. 7 is a simplified flow diagram of at least one embodiment of a method for authenticating a speaker that may be executed by the speech authentication platform of FIGS. 1 and 4.

Referring now to FIG. 7, an illustrative method 700 is provided authenticating a speaker (i.e., an authentication phase), which may be executed by the speech authentication computing device 112, or more particularly the speech authentication platform 114 of the speech authentication computing device 112. The method 700 begins in block 702, in which the speech authentication platform 114 determines whether to perform authentication of a speaker (e.g., the speaker 102 of FIG. 1). For example, the speech authentication platform 114 may determine that a speaker (e.g., that may or may not be authorized access to an asset/location) is requesting access to a particular asset/location secured at least in part by the voice authentication system 100.

If so, the method 700 advances to block 704, in which the speech authentication platform 114 collects a speech signal from a speaker. As described previously, a speech utterance (i.e., the speaker's voice) is received by a speech collection computing device (e.g., the speech collection computing device 106 of FIG. 1) and the converted speech signal is transmitted to the speech authentication computing device 112 for analysis by the speech authentication platform 114. In block 706, the speech authentication platform 114 computes a feature vector for the collected speech signal (see, e.g., the speech signal feature vector generation described in block 540 of the method 500). In block 708, the speech authentication platform 114 retrieves a speech signal classifier associated with the speaker from an authorized speaker database (e.g., the authorized speaker database 406 of FIG. 4).

In block 710, the speech authentication platform 114 feeds the speech signal feature vector for that speaker to the retrieved speech signal classifier associated with that speaker. In block 712, the speech authentication platform 114 receives an output from the speech signal classifier indicating whether the speech signal has been authorized or rejected. In block 714, the speech authentication platform 114 determines whether the speaker is authenticated as a function of the output received from the speech signal classifier.

If the speech authentication platform 114 determines the speaker has been authenticated, the method 700 branches to block 716, in which the speech authentication platform 114 provides an indication to the speaker (e.g., via the speech collection computing device 106) that they were authenticated; otherwise, the method 700 branches to block 718, in which the speech authentication platform 114 provides an indication to the speaker (e.g., via the speech collection computing device 106) that they are not authorized access. It should be appreciated that, in some embodiments, the authentication indication may be further processed (e.g., in conjunction with other access technologies) to make a final authentication decision.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for authenticating a speaker in a voice authentication system using voice biometrics, the method comprising:
   receiving, by a speech authentication computing device, a speech signal of a speaker collected by a speech collection computing device;
   computing, by the speech authentication computing device, a speech signal feature vector for the received speech comprising
      segmenting the speech signal into a plurality of glottal pulses;
      computing a glottal pulse future vector for each of the plurality of glottal pulses comprising decomposing each of the glottal pulses into a plurality of sub-band pulses, performing a metric-based clustering as a function of the glottal pulses and the corresponding plurality of sub-band pulses, and computing the glottal pulse feature vectors as a function of a result of the metric-based clustering; and
      computing the speech signal feature vector as a function of the glottal pulse feature vectors;
   retrieving, by the speech authentication computing device, a speech signal classifier associated with the speaker;
   feeding, by the speech authentication computing device, the speech signal feature vector to the retrieved speech signal classifier; and
   determining, by the speech authentication computing device, whether the speaker is an authorized speaker based on an output of the retrieved speech signal classifier.

2. The method of claim 1, wherein segmenting the speech signal into the plurality of glottal pulses comprises:
   pre-emphasizing the speech signal;
   extracting a plurality of linear prediction coefficients from the pre-emphasized speech signal;
   forming an inverse filter from the extracted linear prediction coefficients;
   filtering the speech signal using the inverse filter to obtain an inverse filtered signal; and
   segmenting the inverse filtered signal into the plurality of glottal pulses.

3. The method of claim 2, wherein segmenting the inverse filtered signal into the plurality of glottal pulses comprises segmenting the inverse filtered signal into the plurality of glottal pulses using zero frequency filtering.

4. The method of claim 1, wherein decomposing each of the glottal pulses comprises decomposing each of the glottal pulses into three sub-band pulses and wherein the metric-based clustering is performed as a function of the glottal pulses and the corresponding three sub-band pulses.

5. The method of claim 4, wherein decomposing each of the glottal pulses into three sub-band pulses comprises:
   transforming each glottal pulse into the frequency domain using a discrete cosine transform (DCT);
   determining two cut-off points of each DCT signal as a function of two identified sharp change points of each DCT signal;
   splitting each DCT signal into three sub-bands as a function of the determined cut-off points; and
   converting the three sub-bands into the time domain to determine the three sub-band pulses for each of the glottal pulses.

6. The method of claim 4, wherein performing the metric-based clustering comprises performing the metric-based clustering using a modified k-means clustering algorithm.

7. The method of claim 1, wherein computing the speech signal feature vector as a function of the glottal pulse feature vectors comprises (i) performing a principal component analysis on the glottal pulse feature vectors to obtain eigenvectors for each glottal pulse feature vector and (ii) determining the speech signal feature vector as a function of each eigenvalue of the obtained eigenvectors.

8. The method of claim 7, wherein determining the speech signal feature vector as a function of each eigenvalue of the obtained eigenvectors comprises determining the speech signal feature vector as a function of an eigenvector of the obtained eigenvectors having the highest eigenvalue.

9. The method of claim 1, further comprising enrolling, by a speech authentication computing device, a speaker in the voice authentication system, wherein enrolling the speaker comprises:
- collecting a requisite number of speech signals from the speaker;
- computing an authenticated speech signal feature vector for each of the collected requisite number of speech signals;
- classifying each of the authenticated speech signal feature vectors as being authenticated; and
- training the speech signal classifier to be associated with speaker as a function of the classification of the authenticated speech signal feature vectors and other speech signal feature vectors of the voice authentication system which have been previously classified as rejected during a background data collection phase for the voice authentication system.

10. The method of claim 9, wherein training the speech signal classifier comprises training the speech signal classifier using a two-class support vector machine classifier with a cosine similarity metric.

11. The method of claim 1, further comprising providing, by a speech authentication computing device, an indication to the speaker indicating whether the speaker was authenticated as a function of the output of the retrieved speech signal classifier.

12. A speech authentication computing device for authenticating a speaker in a voice authentication system using voice biometrics, the speech authentication computing device comprising:
- one or more computer-readable medium comprising instructions; and
- one or more processors coupled with the one or more computer-readable medium and configured to execute the instructions to:
  - receive a speech signal of a speaker collected by a speech collection computing device;
  - compute a speech signal feature vector for the received speech signal comprising
    - segment the speech signal into a plurality of glottal pulses;
    - compute a glottal pulse future vector for each of the plurality of glottal pulses by decomposing each of the glottal pulses into a plurality of sub-band pulses, performing a metric-based clustering as a function of the glottal pulses and the corresponding plurality of sub-band pulses and computing the glottal pulse feature vectors as a function of a result of the metric-based clustering; and
    - compute the speech signal feature vector as a function of the glottal pulse feature vectors;
  - retrieve a speech signal classifier associated with the speaker;
  - feed the speech signal feature vector to the retrieved speech signal classifier; and
  - determine whether the speaker is an authorized speaker based on an output of the retrieved speech signal classifier.

13. The speech authentication computing device of claim 12, wherein to segment the speech signal into the plurality of glottal pulses comprises to:
- pre-emphasize the speech signal;
- extract a plurality of linear prediction coefficients from the pre-emphasized speech signal;
- form an inverse filter from the extracted linear prediction coefficients;
- filter the speech signal using the inverse filter to obtain an inverse filtered signal; and
- segment the inverse filtered signal into the plurality of glottal pulses.

14. The speech authentication computing device of claim 13, wherein to segment the inverse filtered signal into the plurality of glottal pulses comprises to segment the inverse filtered signal into the plurality of glottal pulses using zero frequency filtering.

15. The speech authentication computing device of claim 12, wherein the decomposing each of the glottal pulses comprises decomposing each of the glottal pulses into three sub-band pulses and wherein the metric-based clustering is performed as a function of the glottal pulses and the corresponding three sub-band pulses.

16. The speech authentication computing device of claim 15, wherein to decompose each of the glottal pulses into three sub-band pulses comprises to:
- transform each glottal pulse into the frequency domain using a discrete cosine transform (DCT);
- determine two cut-off points of each DCT signal as a function of two identified sharp change points of each DCT signal;
- split each DCT signal into three sub-bands as a function of the determined cut-off points; and
- convert the three sub-bands into the time domain to determine the three sub-band pulses for each of the glottal pulses.

17. The speech authentication computing device of claim 15, wherein to perform the metric-based clustering comprises to perform the metric-based clustering using a modified k-means clustering algorithm.

18. The speech authentication computing device of claim 12, wherein to compute the speech signal feature vector as a function of the glottal pulse feature vectors comprises to (i) perform a principal component analysis on the glottal pulse feature vectors to obtain eigenvectors for each glottal pulse feature vector and (ii) determine the speech signal feature vector as a function of each eigenvalue of the obtained eigenvectors.

19. The speech authentication computing device of claim 18, wherein to determine the speech signal feature vector as a function of each eigenvalue of the obtained eigenvectors comprises to determine the speech signal feature vector as a function of an eigenvector of the obtained eigenvectors having the highest eigenvalue.

20. The speech authentication computing device of claim 12, wherein the one or more processors are further configured to execute the instructions to enroll a speaker in the voice authentication system, wherein to enroll the speaker comprises to:
- collect a requisite number of speech signals from the speaker;
- compute an authenticated speech signal feature vector for each of the collected requisite number of speech signals;
- classify each of the authenticated speech signal feature vectors as being authenticated; and
- train the speech signal classifier to be associated with speaker as a function of the classification of the authenticated speech signal feature vectors and other speech signal feature vectors of the voice authentication system which have been previously classified as rejected during a background data collection phase for the voice authentication system.

21. The speech authentication computing device of claim 20, wherein to train the speech signal classifier comprises to train the speech signal classifier using a two-class support vector machine classifier with a cosine similarity metric.

22. The speech authentication computing device of claim 12, wherein the one or more processors are further configured to execute the instructions to provide an indication to the speaker indicating whether the speaker was authenticated as a function of the output of the retrieved speech signal classifier.

* * * * *